(12) United States Patent
Johnson et al.

(10) Patent No.: US 10,949,876 B2
(45) Date of Patent: Mar. 16, 2021

(54) SYSTEM AND METHOD FOR MANAGEMENT OF EMAIL MARKETING CAMPAIGNS

(71) Applicant: Overstock.com, Inc., Salt Lake City, UT (US)

(72) Inventors: Bradford Hardy Johnson, Salt Lake City, UT (US); Michael David Breitenbeker, Salt Lake City, UT (US); Joshua Lloyd Selleneit, Salt Lake City, UT (US); Jessica Leigh Hughes, Salt Lake City, UT (US); Catherine Diaz, Salt Lake City, UT (US)

(73) Assignee: Overstock.com, Inc., Midvale, UT (US)

( * ) Notice: Subject to any disclaimer, the term of this patent is extended or adjusted under 35 U.S.C. 154(b) by 0 days.

(21) Appl. No.: 13/663,353

(22) Filed: Oct. 29, 2012

(65) Prior Publication Data
US 2014/0122246 A1    May 1, 2014

(51) Int. Cl.
*G06Q 30/02* (2012.01)

(52) U.S. Cl.
CPC .............................. *G06Q 30/0251* (2013.01)

(58) Field of Classification Search
CPC .............. G06Q 30/02; G06Q 30/0269; G06Q 30/0242; G06Q 30/0601; G06Q 50/01; G06Q 10/06; G06Q 10/10; G06Q 30/0243; G06Q 40/00; G06Q 40/025; G06Q 50/2053; G06Q 20/08; G06Q 30/0214;
(Continued)

(56) References Cited

U.S. PATENT DOCUMENTS

| 3,573,747 A | 4/1971 | Adams et al. |
| 3,581,072 A | 5/1971 | Nymeyer |

(Continued)

FOREIGN PATENT DOCUMENTS

| CA | 2253543 | 10/1997 |
| CA | 2347812 | 5/2000 |

(Continued)

OTHER PUBLICATIONS

2roam, inc., multiple archived pages of www.2roam.com retrieved via Internet Archive Wayback Machine on Jun. 10, 2008.

(Continued)

*Primary Examiner* — Chinyere Mpamugo
(74) *Attorney, Agent, or Firm* — Clayton Howarth, P.C.

(57) ABSTRACT

Systems, programs, non-transitory computer readable mediums, and methods of managing multiple and concurrent online advertising campaigns to eliminate user fatigue are disclosed. In particular, a campaign management server generates multiple target lists of users from a data warehouse for a plurality of pre-defined online advertising campaigns. The users on the target lists are selected to receive electronic communications, such as email or text, containing advertisements based upon target profiles associated with the campaigns as determined by marketing objectives. The advertising campaigns are prioritized such that users on a target list of a higher prioritized campaign are suppressed from lower prioritized campaigns in order to insure that the users receive a predetermined number of electronic communications within a set time frame.

19 Claims, 5 Drawing Sheets

(58) Field of Classification Search
CPC .......... G06Q 30/0256; G06Q 10/1053; G06Q 30/0241; G06Q 30/0244; G06Q 30/0249; G06Q 30/0275; G06Q 30/06; G06Q 10/06311; G06Q 10/06316; G06Q 10/0633; G06Q 10/06398; G06Q 10/107; G06Q 30/0201; G06Q 30/0203; G06Q 30/0209; G06Q 30/0215; G06Q 30/0251; G06Q 30/0252; G06Q 30/0267; G06Q 30/0271; G06Q 30/0277; G06Q 50/06; G06Q 30/0207–0277; H04N 21/812; H04L 67/02
See application file for complete search history.

(56) References Cited

U.S. PATENT DOCUMENTS

| | | | |
|---|---|---|---|
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,808,987 A | 2/1989 | Takeda et al. | |
| 4,823,265 A | 4/1989 | Nelson | |
| 4,854,516 A | 8/1989 | Yamada | |
| 4,903,201 A | 2/1990 | Wagner | |
| RE33,316 E | 8/1990 | Katsuta et al. | |
| 5,027,110 A | 6/1991 | Chang et al. | |
| 5,053,956 A | 10/1991 | Donald et al. | |
| 5,063,507 A | 11/1991 | Lindsey et al. | |
| 5,077,665 A | 12/1991 | Silverman et al. | |
| 5,101,353 A | 3/1992 | Lupien et al. | |
| 5,136,501 A | 8/1992 | Silverman et al. | |
| 5,168,446 A | 12/1992 | Wiseman | |
| 5,205,200 A | 4/1993 | Wright | |
| 5,243,515 A | 9/1993 | Lee | |
| 5,258,908 A | 11/1993 | Hartheimer et al. | |
| 5,280,422 A | 1/1994 | Moe et al. | |
| 5,297,031 A | 3/1994 | Gutterman et al. | |
| 5,297,032 A | 3/1994 | Trojan et al. | |
| 5,301,350 A | 4/1994 | Rogan et al. | |
| 5,305,200 A | 4/1994 | Hartheimer et al. | |
| 5,325,297 A | 6/1994 | Bird et al. | |
| 5,329,589 A | 7/1994 | Fraser et al. | |
| 5,347,632 A | 9/1994 | Filepp et al. | |
| 5,375,055 A | 12/1994 | Togher et al. | |
| 5,377,354 A * | 12/1994 | Scannell | H04L 51/22 706/45 |
| 5,394,324 A | 2/1995 | Clearwater | |
| 5,407,433 A | 4/1995 | Loomas | |
| 5,411,483 A | 5/1995 | Loomas et al. | |
| 5,426,281 A | 6/1995 | Abecassis | |
| 5,485,510 A | 1/1996 | Colbert | |
| 5,493,677 A | 2/1996 | Balogh et al. | |
| 5,553,145 A | 9/1996 | Micali | |
| 5,557,728 A | 9/1996 | Garrett et al. | |
| 5,579,471 A | 11/1996 | Barber et al. | |
| 5,596,994 A | 1/1997 | Bro | |
| 5,598,557 A | 1/1997 | Doner et al. | |
| 5,621,790 A * | 4/1997 | Grossman | H04M 3/36 379/210.01 |
| 5,640,569 A | 6/1997 | Miller et al. | |
| 5,657,389 A | 8/1997 | Houvener | |
| 5,664,111 A | 9/1997 | Nahan et al. | |
| 5,664,115 A | 9/1997 | Fraser | |
| 5,689,652 A | 11/1997 | Lupien et al. | |
| 5,694,546 A | 12/1997 | Reisman | |
| 5,706,457 A | 1/1998 | Dwyer et al. | |
| 5,710,889 A | 1/1998 | Clark et al. | |
| 5,715,314 A | 2/1998 | Payne et al. | |
| 5,715,402 A | 2/1998 | Popolo | |
| 5,717,989 A | 2/1998 | Tozzoli et al. | |
| 5,721,908 A | 2/1998 | Lagarde et al. | |
| 5,722,418 A | 3/1998 | Bro | |
| 5,727,165 A | 3/1998 | Ordish et al. | |
| 5,737,599 A | 4/1998 | Rowe et al. | |
| 5,760,917 A | 6/1998 | Sheridan | |
| 5,761,496 A | 6/1998 | Hattori | |
| 5,761,655 A | 6/1998 | Hoffman | |
| 5,761,662 A | 6/1998 | Dasan | |
| 5,771,291 A | 6/1998 | Newton et al. | |
| 5,771,380 A | 6/1998 | Tanaka et al. | |
| 5,778,367 A | 7/1998 | Wesinger, Jr. et al. | |
| 5,790,790 A | 8/1998 | Smith et al. | |
| 5,794,216 A | 8/1998 | Brown | |
| 5,794,219 A | 8/1998 | Brown | |
| 5,796,395 A | 8/1998 | de Hond | |
| 5,799,285 A | 8/1998 | Klingman | |
| 5,803,500 A | 9/1998 | Mossberg | |
| 5,818,914 A | 10/1998 | Fujisaki | |
| 5,826,244 A | 10/1998 | Huberman | |
| 5,835,896 A | 11/1998 | Fisher et al. | |
| 5,845,265 A | 12/1998 | Woolston | |
| 5,845,266 A | 12/1998 | Lupien et al. | |
| 5,850,442 A | 12/1998 | Muftic | |
| 5,870,754 A | 2/1999 | Dimitrova et al. | |
| 5,872,848 A | 2/1999 | Romney et al. | |
| 5,873,069 A | 2/1999 | Reuhl et al. | |
| 5,873,080 A | 2/1999 | Coden et al. | |
| 5,884,056 A | 3/1999 | Steele | |
| 5,890,138 A | 3/1999 | Godin et al. | |
| 5,890,175 A | 3/1999 | Wong et al. | |
| 5,905,975 A | 5/1999 | Ausubel | |
| 5,907,547 A | 5/1999 | Foladare et al. | |
| 5,913,215 A | 6/1999 | Rubinstein et al. | |
| 5,922,074 A | 7/1999 | Richard et al. | |
| 5,924,072 A | 7/1999 | Havens | |
| 5,926,794 A | 7/1999 | Fethe | |
| 5,948,040 A | 9/1999 | DeLorme et al. | |
| 5,948,061 A | 9/1999 | Merriman et al. | |
| 5,974,412 A | 10/1999 | Hazlehurst et al. | |
| 5,986,662 A | 11/1999 | Argiro et al. | |
| 5,987,446 A | 11/1999 | Corey et al. | |
| 5,991,739 A | 11/1999 | Cupps et al. | |
| 5,999,915 A | 12/1999 | Nahan et al. | |
| 6,012,053 A | 1/2000 | Pant et al. | |
| 6,029,141 A | 2/2000 | Bezos et al. | |
| 6,035,288 A | 3/2000 | Solomon | |
| 6,035,402 A | 3/2000 | Vaeth et al. | |
| 6,044,363 A | 3/2000 | Mori et al. | |
| 6,045,447 A | 4/2000 | Yoshizawa et al. | |
| 6,047,264 A | 4/2000 | Fisher et al. | |
| 6,055,518 A | 4/2000 | Franklin et al. | |
| 6,058,379 A | 5/2000 | Odom et al. | |
| 6,058,417 A | 5/2000 | Hess et al. | |
| 6,058,428 A | 5/2000 | Wang et al. | |
| 6,061,448 A | 5/2000 | Smith et al. | |
| 6,065,041 A | 5/2000 | Lum et al. | |
| 6,070,125 A | 5/2000 | Murphy et al. | |
| 6,073,117 A | 6/2000 | Oyanagi et al. | |
| 6,078,914 A | 6/2000 | Redfern | |
| 6,085,176 A | 7/2000 | Woolston | |
| 6,104,815 A | 8/2000 | Alcorn et al. | |
| 6,119,137 A | 9/2000 | Smith et al. | |
| 6,128,649 A | 10/2000 | Smith et al. | |
| 6,141,010 A | 10/2000 | Hoyle | |
| 6,167,382 A | 12/2000 | Sparks et al. | |
| 6,178,408 B1 | 1/2001 | Copple et al. | |
| 6,185,558 B1 | 2/2001 | Bowman et al. | |
| 6,192,407 B1 | 2/2001 | Smith et al. | |
| 6,199,077 B1 | 3/2001 | Inala et al. | |
| 6,202,051 B1 | 3/2001 | Woolston | |
| 6,202,061 B1 | 3/2001 | Khosla et al. | |
| 6,226,412 B1 | 5/2001 | Schwab | |
| 6,243,691 B1 | 6/2001 | Fisher et al. | |
| 6,269,238 B1 | 7/2001 | Iggulden | |
| 6,271,840 B1 | 8/2001 | Finseth et al. | |
| 6,275,820 B1 | 8/2001 | Navin-Chandra et al. | |
| 6,275,829 B1 | 8/2001 | Angiulo et al. | |
| 6,356,879 B2 | 3/2002 | Aggarwal et al. | |
| 6,356,908 B1 | 3/2002 | Brown et al. | |
| 6,366,899 B1 | 4/2002 | Kernz | |
| 6,370,527 B1 | 4/2002 | Singhal | |
| 6,373,933 B1 | 4/2002 | Sarkki et al. | |

(56) References Cited

U.S. PATENT DOCUMENTS

| | | | |
|---|---|---|---|
| 6,374,260 B1 | 4/2002 | Hoffert et al. | |
| 6,381,410 B1 | 4/2002 | Amidhozour et al. | |
| 6,415,320 B1 | 7/2002 | Hess et al. | |
| 6,434,556 B1 | 8/2002 | Levin et al. | |
| 6,456,307 B1 | 9/2002 | Bates et al. | |
| 6,460,020 B1 | 10/2002 | Pool et al. | |
| 6,466,917 B1 | 10/2002 | Goyal et al. | |
| 6,484,149 B1 | 11/2002 | Jammes et al. | |
| 6,489,968 B1 | 12/2002 | Ortega et al. | |
| 6,522,955 B1 | 2/2003 | Colborn | |
| 6,523,037 B1 | 2/2003 | Monahan et al. | |
| 6,601,061 B1 | 7/2003 | Holt et al. | |
| 6,604,107 B1 | 8/2003 | Wang | |
| 6,625,764 B1 | 9/2003 | Dawson | |
| 6,643,696 B2 | 11/2003 | Davis et al. | |
| 6,661,431 B1 | 12/2003 | Stuart et al. | |
| 6,665,838 B1 | 12/2003 | Brown et al. | |
| 6,701,310 B1 | 3/2004 | Sugiura et al. | |
| 6,718,536 B2 | 4/2004 | Dupaquis | |
| 6,728,704 B2 | 4/2004 | Mao et al. | |
| 6,732,161 B1 | 5/2004 | Hess et al. | |
| 6,732,162 B1 | 5/2004 | Wood et al. | |
| 6,856,963 B1 | 2/2005 | Hurwitz | |
| 6,889,054 B2 | 5/2005 | Himmel et al. | |
| 7,069,242 B1 | 6/2006 | Sheth et al. | |
| 7,076,453 B2 | 7/2006 | Jammes et al. | |
| 7,100,111 B2 | 8/2006 | McElfresh et al. | |
| 7,100,195 B1 | 8/2006 | Underwood | |
| 7,117,207 B1 | 10/2006 | Kerschberg et al. | |
| 7,127,416 B1 | 10/2006 | Tenorio | |
| 7,165,091 B2 | 1/2007 | Lunenfeld | |
| 7,167,910 B2 | 1/2007 | Farnham et al. | |
| 7,216,115 B1 | 5/2007 | Walters et al. | |
| 7,254,547 B1 | 8/2007 | Beck et al. | |
| 7,340,249 B2 | 3/2008 | Moran et al. | |
| 7,349,668 B2 | 3/2008 | Ilan et al. | |
| 7,366,755 B1 | 4/2008 | Cuomo et al. | |
| 7,379,890 B2 | 5/2008 | Myr et al. | |
| 7,380,217 B2 | 5/2008 | Gvelesiani | |
| 7,454,464 B2 | 11/2008 | Puthenkulam et al. | |
| 7,493,521 B1 | 2/2009 | Li et al. | |
| 7,496,582 B2 | 2/2009 | Farnham et al. | |
| 7,552,067 B2 | 6/2009 | Nephew et al. | |
| 7,606,743 B2 | 10/2009 | Orzell et al. | |
| 7,610,212 B2 | 10/2009 | Klett et al. | |
| 7,653,573 B2 | 1/2010 | Hayes, Jr. et al. | |
| 7,912,748 B1 | 3/2011 | Rosenberg et al. | |
| 7,983,950 B2 | 7/2011 | DeVita | |
| 8,112,303 B2 | 2/2012 | Eglen et al. | |
| 8,312,056 B1* | 11/2012 | Peng | G06Q 50/01 707/802 |
| 2001/0034667 A1 | 10/2001 | Petersen | |
| 2001/0034668 A1 | 10/2001 | Whitworth | |
| 2001/0044751 A1 | 11/2001 | Pugliese et al. | |
| 2001/0047290 A1 | 11/2001 | Petras et al. | |
| 2001/0051996 A1 | 12/2001 | Cooper et al. | |
| 2002/0002513 A1 | 1/2002 | Chiasson | |
| 2002/0007356 A1* | 1/2002 | Rice | G06N 5/04 706/47 |
| 2002/0022995 A1 | 2/2002 | Miller et al. | |
| 2002/0023059 A1 | 2/2002 | Bari et al. | |
| 2002/0026390 A1 | 2/2002 | Ulenas et al. | |
| 2002/0029187 A1 | 3/2002 | Meehan et al. | |
| 2002/0038312 A1* | 3/2002 | Donner et al. | 707/200 |
| 2002/0042738 A1 | 4/2002 | Srinivasan et al. | |
| 2002/0099602 A1 | 7/2002 | Moskowitz et al. | |
| 2002/0107718 A1 | 8/2002 | Morrill et al. | |
| 2002/0129282 A1 | 9/2002 | Hopkins | |
| 2002/0147625 A1 | 10/2002 | Kolke | |
| 2002/0161648 A1 | 10/2002 | Mason et al. | |
| 2002/0198784 A1 | 12/2002 | Shaak et al. | |
| 2003/0004855 A1 | 1/2003 | Dutta et al. | |
| 2003/0005046 A1 | 1/2003 | Kavanagh et al. | |
| 2003/0009392 A1 | 1/2003 | Perkowski | |
| 2003/0036914 A1 | 2/2003 | Fitzpatrick et al. | |
| 2003/0041008 A1 | 2/2003 | Grey et al. | |
| 2003/0046149 A1 | 3/2003 | Wong | |
| 2003/0069740 A1 | 4/2003 | Zeidman | |
| 2003/0088467 A1 | 5/2003 | Culver | |
| 2003/0088511 A1 | 5/2003 | Karboulonis et al. | |
| 2003/0093331 A1 | 5/2003 | Childs et al. | |
| 2003/0110100 A1 | 6/2003 | Wirth, Jr. | |
| 2003/0131095 A1 | 7/2003 | Kumhyr | |
| 2003/0139969 A1 | 7/2003 | Scroggie et al. | |
| 2003/0158792 A1 | 8/2003 | Perkowski | |
| 2003/0163340 A1 | 8/2003 | Fitzpatrick et al. | |
| 2003/0167213 A1 | 9/2003 | Jammes et al. | |
| 2003/0200156 A1 | 10/2003 | Roseman et al. | |
| 2003/0204449 A1 | 10/2003 | Kotas et al. | |
| 2003/0217002 A1 | 11/2003 | Enborg | |
| 2004/0006509 A1 | 1/2004 | Mannik et al. | |
| 2004/0015416 A1 | 1/2004 | Foster et al. | |
| 2004/0055017 A1 | 3/2004 | Delpuch et al. | |
| 2004/0078388 A1 | 4/2004 | Melman | |
| 2004/0128320 A1 | 7/2004 | Grove et al. | |
| 2004/0172379 A1 | 9/2004 | Mott et al. | |
| 2004/0174979 A1 | 9/2004 | Hutton et al. | |
| 2004/0199496 A1 | 10/2004 | Liu et al. | |
| 2004/0204989 A1* | 10/2004 | Dicker | G06Q 30/0269 705/14.13 |
| 2004/0204991 A1 | 10/2004 | Monahan et al. | |
| 2004/0249727 A1 | 12/2004 | Cook, Jr. et al. | |
| 2005/0021666 A1 | 1/2005 | Dinnage et al. | |
| 2005/0038733 A1 | 2/2005 | Foster et al. | |
| 2005/0044254 A1 | 2/2005 | Smith | |
| 2005/0060664 A1 | 3/2005 | Rogers | |
| 2005/0097204 A1* | 5/2005 | Horowitz et al. | 709/223 |
| 2005/0131837 A1 | 6/2005 | Sanctis et al. | |
| 2005/0198031 A1 | 9/2005 | Pezaris et al. | |
| 2005/0203888 A1 | 9/2005 | Woolsey et al. | |
| 2006/0009994 A1 | 1/2006 | Hogg et al. | |
| 2006/0010105 A1 | 1/2006 | Sarukkai et al. | |
| 2006/0031240 A1 | 2/2006 | Eyal et al. | |
| 2006/0041638 A1 | 2/2006 | Whittaker et al. | |
| 2006/0058048 A1 | 3/2006 | Kapoor et al. | |
| 2006/0069623 A1 | 3/2006 | MacDonald Korth et al. | |
| 2006/0085251 A1 | 4/2006 | Greene | |
| 2006/0173817 A1 | 8/2006 | Chowdhury et al. | |
| 2006/0206479 A1 | 9/2006 | Mason | |
| 2006/0235752 A1* | 10/2006 | Kavanagh | G06Q 30/0255 705/14.53 |
| 2006/0259360 A1 | 11/2006 | Flinn et al. | |
| 2006/0271671 A1 | 11/2006 | Hansen | |
| 2007/0073641 A1 | 3/2007 | Perry et al. | |
| 2007/0078726 A1 | 4/2007 | MacDonald Korth et al. | |
| 2007/0100803 A1 | 5/2007 | Cava | |
| 2007/0162379 A1 | 7/2007 | Skinner | |
| 2007/0233565 A1 | 10/2007 | Herzog et al. | |
| 2007/0239534 A1 | 10/2007 | Liu et al. | |
| 2007/0245013 A1 | 10/2007 | Saraswathy et al. | |
| 2007/0288298 A1* | 12/2007 | Gutierrez | G06Q 30/0201 705/7.29 |
| 2008/0052152 A1 | 2/2008 | Yufik | |
| 2008/0126205 A1 | 5/2008 | Evans et al. | |
| 2008/0126476 A1 | 5/2008 | Nicholas et al. | |
| 2008/0133305 A1 | 6/2008 | Yates et al. | |
| 2008/0140765 A1 | 6/2008 | Kelaita et al. | |
| 2008/0162574 A1 | 7/2008 | Gilbert | |
| 2008/0201218 A1 | 8/2008 | Broder et al. | |
| 2008/0288338 A1 | 11/2008 | Wiseman et al. | |
| 2008/0300909 A1* | 12/2008 | Rikhtverchik | G06Q 30/00 705/1.1 |
| 2009/0006190 A1 | 1/2009 | Lucash et al. | |
| 2009/0030755 A1 | 1/2009 | Altberg et al. | |
| 2009/0030775 A1* | 1/2009 | Vieri | G06Q 30/02 705/14.54 |
| 2009/0106127 A1 | 4/2009 | Purdy et al. | |
| 2009/0204848 A1 | 8/2009 | Kube et al. | |
| 2009/0240582 A1 | 9/2009 | Sheldon-Neal et al. | |

(56) References Cited

U.S. PATENT DOCUMENTS

| | | | |
|---|---|---|---|
| 2010/0094673 | A1 | 4/2010 | Lobo et al. |
| 2011/0060621 | A1 | 3/2011 | Weller et al. |

FOREIGN PATENT DOCUMENTS

| | | | | |
|---|---|---|---|---|
| EP | 0636993 | | 4/1999 | |
| EP | 0807891 | | 5/2000 | |
| EP | 1241603 | | 3/2001 | |
| JP | 2001283083 | | 10/2001 | |
| WO | 97/17663 | | 5/1997 | |
| WO | 98/32289 | | 7/1998 | |
| WO | 98/47082 | | 10/1998 | |
| WO | WO-9849641 | A1 * | 11/1998 | ............ G06Q 30/02 |
| WO | WO 1998049641 | A1 * | 11/1998 | ............ G06Q 30/02 |
| WO | 99/59283 | | 11/1999 | |
| WO | 00/25218 | | 5/2000 | |

OTHER PUBLICATIONS

Alt et al., "Bibliography on Electronic Commerce," Electronic Markets—The International Journal, Oct. 1993, 5 pages, vol. 3, No. 3.
Alt et al., "Computer Integrated Logistics," Electronic Markets—The International Journal, Oct. 1993, 1 page, vol. 3, No. 3.
Anonymous, Image manipulation (image-editing software and image-manipulation systems) (Seybold Special Report, Part II), Seybold Report on Publishing Systems, May 15, 19995, pS35(9), vol. 24, No. 18.
auctionwatch.com, multiple pages—including search results for "expedition," printed Apr. 21, 2011.
auctiva.com, multiple pages, undated but website copyright date is "1999-2000."
Berger et al., "Random Multiple-Access Communication and Group Testing," IEEE, 1984.
Braganza, "Is Research at Cranfield—A Look at the Future," Electronic Markets—The International Journal, Oct. 1993, 1 page, vol. 3, No. 3.
Brecht et al., "The IM 2000 Research Programme," Electronic Markets—The International Journal, Oct. 1993, 1 page, vol. 3, No. 3.
Business Wire business editors/high-tech writers, "2Roam Partners with Pumatech to Delivery Wireless Alerts," Business Wire, Dec. 18, 2000.
Business Wire business editors/high-tech writers, "2Roam Takes eHow's How-to Solutions Wireless: With 2Roam, the Web's One-Stop Source for Getting Things Done is on More Wireless Devices, with Ability to Purchase Its Products from Anywhere," Business Wire, Oct. 2, 2000.
Business Wire business editors/high-tech writers, "2Roam Drivers Hertz to the Wireless Web; Number One Car Rental Company to Provide Customers Wireless Access from Any Device," Business Wire, Aug. 7, 2001.
buy.com, www.buy.com homepage, printed Oct. 13, 2004.
Chen et al., "Detecting Web Page Structure for Adaptive Viewing on Small Form Factor Devices," ACM, May 20-24, 2003.
Clarke, "Research Programme in Supra-organizational Systems," Electronic Markets—The International Journal, Oct. 1993, 2 pages, vol. 3, No. 3.
Clemons et al. "Evaluation the prospects for alternative electronic securities markets," Proceedings of the twelfth international conference on information systems, New York, New York, United States, pp. 53-64, 1991.
friendster.com, homepage and "more info" pages, printed Apr. 29, 2004.
Google News archive search for "2Roam marketing" performed over the date range 2000-2003.
Google News archive search for "2Roam SMS" performed over the date range 2000-2008.

Grabowski et al., "Mobile-enabled grid middleware and/or grid gateways," GridLab—A grid Application Toolkit and Testbed, Work Package 12—Access for Mobile Users, Jun. 3, 2003.
Graham, "The Emergence of Linked Fish Markets in Europe," Electronic Markets—The International Journal, Jul. 1998, 4 pages, vol. 8, No. 2.
Gunthorpe et al., "Portfolio Composition and the Investment Horizon," Financial Analysts Journal, Jan.-Feb. 1994, pp. 51-56.
Halperin, "Toward a Process Handbook for Organizational Coordination Processes," Electronic Markets—The International Journal, Oct. 1993, 1 page, vol. 3, No. 3.
Hess et al., "Computerized Loan Origination Systems: An Industry Case Study of the Electronic Markets Hypothesis," MIS Quarterly, Sep. 1994, pp. 251-275.
IBM, "Anonymous Delivery of Goods in Electronic Commerce," IBM Technical Disclosure BUlletin, Mar. 1996, pp. 363-366, vol. 39, No. 3.
IBM, "Personal Optimized Decision/Transaction Program," IBM Technical Disclosure Bulletin, Jan. 1995, pp. 83-84, vol. 38, No. 1.
IEEE 100—The Authoritative Dictionary of IEEE Standards Terms, Seventh Edition, 2000. Entire book cited; table of contents, source list, and terms beginning with A included. ISBN 0-7381-2601-2.
Ives et al., "Editor's Comments—MISQ Central: Creating a New Intellectual Infrastructure," MIS Quarterly, Sep. 1994, p. xxxv.
Klein, "Information Logistics," Electronic Markets—The International Journal, Oct. 1993, pp. 11-12, vol. 3, No. 3.
Klein, "Introduction to Electronic Auctions," Electronic Markets—The International Journal, Dec. 1997, 4 pages, vol. 7, No. 4.
Kubicek, "The Organization Gap," Electronic Markets—The International Journal, Oct. 1993, 1 page, vol. 3, No. 3.
Kuula, "Telematic Services in Finland," Electronic Markets—The International Journal, Oct. 1993, 1 page, vol. 3, No. 3.
Lalonde, "The EDI World Institute: An International Approach," Electronic Markets—The International Journal, Oct. 1993, 1 page, vol. 3, No. 3.
Lee et al., "Intelligent Electronic Trading for Commodity Exchanges," Electronic Markets—The International Journal, Oct. 1993, 2 pages, vol. 3, No. 3.
Lee et al., "Electronic Brokerage and Electronic Auction: The Impact of IT on Market Structures," Proceedings of the 29th Annual Hawaii International Conference on System Sciences, 1996, pp. 397-406.
Lee, "AUCNET: Electronic Intermediary for Used-Car Transactions," Electronic Markets—The International Journal, Dec. 1997, pp. 24-28, vol. 7, No. 4.
Live365 press release, "Live365 to Offer Opt-In Advertising on Its Website," Oct. 15, 2004.
London Business School, "Overture and Google: Internet Pay-Per-Click (PPC) Advertising Options," Mar. 2003.
M2 Presswire, "Palm, Inc.: Palm unveils new web browser optimised for handhelds; HTML browser offers high-speed web-browsing option," Mar. 13, 2002.
Malone et al., "Electronic Markets and Electronic Hierarchies," Communications of the ACM, Jun. 1987, pp. 484-497, vol. 30, No. 6.
Mansell et al., "Electronic Trading Networks: The Route to Competitive Advantage?" Electronic Markets—The International Journal, Oct. 1993, 1 page, vol. 3, No. 3.
Mardesich, "Onsale takes auction gavel electronic," Computer Reseller News, Jul. 8, 1996, pp. 2, 32.
Marteau, "Shop with One Click, Anywhere, Anytime," Information Management and Consulting, 2000, pp. 44-46, vol. 15, No. 4.
Massimb et al., "Electronic Trading, Market Structure and Liquidity," Financial Analysts Journal, Jan.-Feb. 1994, pp. 39-49.
McGinity, "Build Your Weapon," PC Magazine, Apr. 24, 2011, printed from www.pcmag.com/print_article2?0,1217,a%253D3955,00.asp.
Meade, "Visual 360: a performance appraisal system that's 'fun,'" HR Magazine, 44, 7, 118(3), Jul. 1999.
"Mediappraise: Mediappraise Receives National Award for Web-Based Technology That Enables Companies to Solve Thorny HR Problem," Dec. 14, 1998.

(56) References Cited

OTHER PUBLICATIONS

Medvinsky et al., "Electronic Currency for the Internet," Electronic Markets—The International Journal, Oct. 1993, 2 pages, vol. 3, No. 3.
metails.com, www.metails.com homepage, printed Oct. 13, 2004.
Microsoft Computer Dictionary, Fifth Edition, front matter and p. 33.
Microsoft Computer Dictionary, Fifth Edition, front matter, back matter, and pp. 479, 486.
Neches, "Fast—A Research Project in Electronic Commerce," Electronic Markets—The International Journal, Oct. 1993, 4 pages, vol. 3, No. 3.
Neo, "The implementation of an electronic market for pig trading in Singapore," Journal of Strategic Information Systems, Dec. 1992, pp. 278-288, vol. 1, No. 5.
O'Mahony, "An X.500-based Product Catalogue," Electronic Markets—The International Journal, Oct. 1993, 2 pages, vol. 3, No. 3.
"Onsale: Onsale Brings Thrill of Auctions and Bargain Hunting Online: Unique Internet retail service debuts with week-long charity auction for the Computer Museum in Boston," May 24, 1995, printed from www.dialogweb.com/cgi/dwclient?dwcommand,DWEBPRINT%20810-489267.
"Onsale joins fray as online shopping picks up speed: Internet Booms," Computer Reseller News, Jun. 5, 1995.
Palm, Inc. Palm™ Web Pro Handbook, copyright 2002-2003.
Post et al., "Application of Auctions as a Pricing Mechanism for the Interchange of Electric Power," IEEE Transactions on Power Systems, Aug. 1995, pp. 1580-1584, vol. 10, No. 3.
Preist et al., "Adaptive agents in a persistent shout double auction," International Conference on Information and Computation, Proceedings of the first international conference on information and computation economies, Oct. 25-28, 1998, Charleston, United States, pp. 11-18.
Qualcomm, "Brew Developer Support," printed from web.archive.org/web/20020209194207/http:/www.qualcomm.com/brew/developer/support/kb/52.html on Aug. 30, 2007.
RCR Wireless News, "Lockheed Martin to use 2Roam's technology for wireless platform," RCR Wireless News, Sep. 10, 2001.
Reck, "Formally Specifying an Automated Trade Execution System," J. Systems Software, 1993, pp. 245-252, vol. 21.
Reck, "Trading-Process Characteristics of Electronic Auctions," Electronic Markets—The International Journal, Dec. 1997, pp. 17-23, vol. 7, No. 4.
repcheck.com, www.repcheck.com homepage, printed from web.archive.org/web/20020330183132/http://percheck.com on Sep. 5, 2009.
Resnick et al., "Reputation Systems," Communications of the ACM, Dec. 2000, pp. 45-48, vol. 43, No. 12.
Rockoff et al., "Design of an Internet-based system for remote Dutch auctions," Internet Research: Electronic Networking Applications and Policy, 1995, pp. 10-16, vol. 5, No. 4.
Rose, "Vendors strive to undo Adobe lock-hold," Computer Reseller News, Feb. 5, 1996, n 66669, p. 71(7).
Rysavy, "Mobile-commerce ASPs do the legwork," Network Computing, Jan. 22, 2001, p. 71, 6 pgs., vol. 12, No. 2.
Saunders, "AdFlight to Offer WAP Ads," Oct. 17, 2000, printed from clickz.com/487531/print.
Schmid, "Electronic Markets," Electronic Markets—The International Journal, Oct. 1993, 2 pages, vol. 3, No. 3.
Schwankert, "Matsushita Taps 2Roam for Wireless Solutions," www.internetnews.com/bus-news.article.php/674811, Feb. 2, 2001.
Siegmann, "Nowhere to go but up," PC Week, Oct. 23, 1995, 3 pages, vol. 12, No. 42.
Telephony Staff, "Air-ASP," Telephone Online, Oct. 2, 2000, 3 pages.
Teo, "Organizational Factors of Success in Using EDIS: A Survey of Tradenet Participants," Electronic Markets—The International Journal, Oct. 1993, 2 pages, vol. 3, No. 3.
Tjostheim et al., "A case study of an on-line auction for the World Wide Web," printed from www.nr.no/gem/elcom/puplikasjoner/enter98e.html on Jun. 10, 1999, 10 pages.
Turban, "Auctions and Bidding on the Internet: An Assessment," Electronic Markets—The International Journal, Dec. 1997, 5 pages, vol. 7, No. 4.
ubid.com, "How do I Update my Address, Phone, Credit Card, Password, etc.?" printed from web.archive.org/web/20010208113903/www.ubid.com/help/topic13asp on Aug. 30, 2007.
ubid.com, "How do I track my shipment?" printed from web.archive.org/web/20010331032659/www.ubid.com/help/topic27.asp on Aug. 30, 2007.
ubid.com, "Can I track all of my bids from My Page?" printed from web.archive.org/web/20010208114049/www.ubid/com/help/topic14.asp on Aug. 30, 2007.
Van Heck et al., "Experiences with Electronic Auctions in the Dutch Flower Industry," Electronic Markets—The International Journal, Dec. 1997, 6 pages, vol. 7, No. 4.
Verizon Wireless, "Verizon Wireless Customers Get It NowSM; Get Games, Get Pix, Get Ring Tones and Get Going in Full Color," press release to Prnewswire, Sep. 23, 2002.
Warbelow et al., "AUCNET: TV Auction Network System," Harvard Business School 9-190-001, Jul. 19, 1989, Rev. Apr. 12, 1996, pp. 1-15.
Weber, "How Financial Markets are Going On-line," Electronic Markets—The International Journal, Oct. 1993, 2 pages, vol. 3, No. 3.
Wireless Internet, "DailyShopper Selects 2Roam to Enable Mobile Customers to Retrieve Nearby Sales and Promotions Information," Wireless Internet, Apr. 2001.
Wireless Week, "Verizon Wireless Gets Going on BREW Agenda," Wireless Week, Sep. 23, 2002.
xchanger.net, webpage printed from www.auctiva.com/showcases/as_4sale.asp?uid=exchanger, undated but at least as early as Oct. 12, 2000.
Yu et al., "Distributed Reputation Management for Electronic Commerce," Computational Intelligence, 2002, pp. 535-549, vol. 18, No. 4.
Zetmeir, Auction Incentive Marketing, print of all pages of website found at home.earthlink.net/~bidpointz/ made Oct. 8, 2004.
Zimmermann, "Integration of Financial Services: The TeleCounter," Electronic Markets—The International Journal, Oct. 1993, 1 page, vol. 3, No. 3.
Zwass, "Electronic Commerce: Structures and Issues," International Journal of Electronic Commerce, Fall 1996, pp. 3-23, vol. 1, No. 1.

* cited by examiner

SYSTEM AND METHOD FOR MANAGEMENT OF EMAIL MARKETING CAMPAIGNS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. The Field of the Present Disclosure

The present disclosure relates generally to communication networks and e-commerce, and more particularly, but not necessarily entirely, to systems, programs, and methods of managing online advertising campaigns for e-commerce enterprises.

2. Description of Related Art

Electronic commerce, commonly known as "e-commerce," involves the buying and selling of products or services using electronic systems, such as the Internet and other computer networks. E-commerce has grown to include electronic transactions conducted over smart phones and other emerging technologies. In a typical transaction, a consumer, sometimes referred to herein as a "user," accesses an e-commerce website of an e-commerce enterprise from a user access device. The user may search the e-commerce website for desired products or services using a local search engine. In addition, the user may search the e-commerce website for desired products through a product hierarchy. Using an established checkout procedure, the user is able to purchase the desired product or service from the e-commerce website as is known to those having skill in the art.

Operators of e-commerce enterprises track data regarding their users. In some instances, an e-commerce enterprise may gather demographic data about its users as well as purchasing habits and other information. Operators of e-commerce enterprises often engage in active marketing campaigns to drive traffic to their e-commerce websites. These marketing campaigns may involve targeting previous users based on the data collected for the users. One type of marketing campaign involves sending targeted electronic communications, such as emails or text messages, to users. The communications typically include advertisements, such as product promotions and other advertisements, within the body of the message. The body of the message typically includes a link to an e-commerce webpage such that users can quickly review further information about the products or make product purchases.

As mentioned, marketing campaigns may be specifically targeted to users. To implement a targeted marketing campaign, e-commerce enterprises may track and store user information in a data warehouse. For example, the user information may include demographic information about the users visiting an e-commerce website, such as e-mail addresses, cell phone numbers, gender, age, education, interests, hobbies, etc. In addition, the user information may include user history information regarding a user's interaction with an e-commerce website, such as information regarding prior purchases, items viewed, items placed into a virtual shopping cart but removed prior to purchase, etc.

The user information tracked and stored by an e-commerce website is commonly utilized to generate targeted online advertising campaigns. That is, an e-commerce enterprise may generate an online advertising campaign that targets users who may be interested in a specific product or service as determined from their stored user information.

As will be understood by those having ordinary skill in the relevant art, generating an online electronic advertising campaign is a time-intensive process for large e-commerce enterprises. For example, the marketing department of the e-commerce enterprise selects the product or service to be advertised and creates an electronic template of the promotion. Next, the marketing department identifies the profile of the targeted users, i.e., a target profile. Once the target profile is identified, a query of a data warehouse is performed to identify users matching the target profile and generate a list of targeted users. Next, a customized electronic communication for each user is generated from the template using a computer. If the number of targeted users is large, this step may take several hours or even days. Lastly, the electronic communication is sent to each of the targeted users. Again, the above process can take several hours or days depending on the size of the campaign.

One drawback to the widespread use of electronic marketing campaigns is that of user fatigue. User fatigue occurs when users receive multiple electronic communications from an e-commerce enterprise within a short time frame. When user fatigue occurs, campaigns become less effective and may even cause users to opt out of future campaigns. In particular, users' in-boxes are often bombarded with advertisements from e-commerce enterprises. For example, in some instances, users may receive several emails a day from the same e-commerce enterprise. This typically occurs when a user's profile matches the target profile of several concurrent running marketing campaigns implemented by an e-commerce enterprise. In the past, there have been ineffective tools for coordinating between two or more concurrent marketing campaigns to prevent users from receiving multiple communications within a given time period.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description that follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
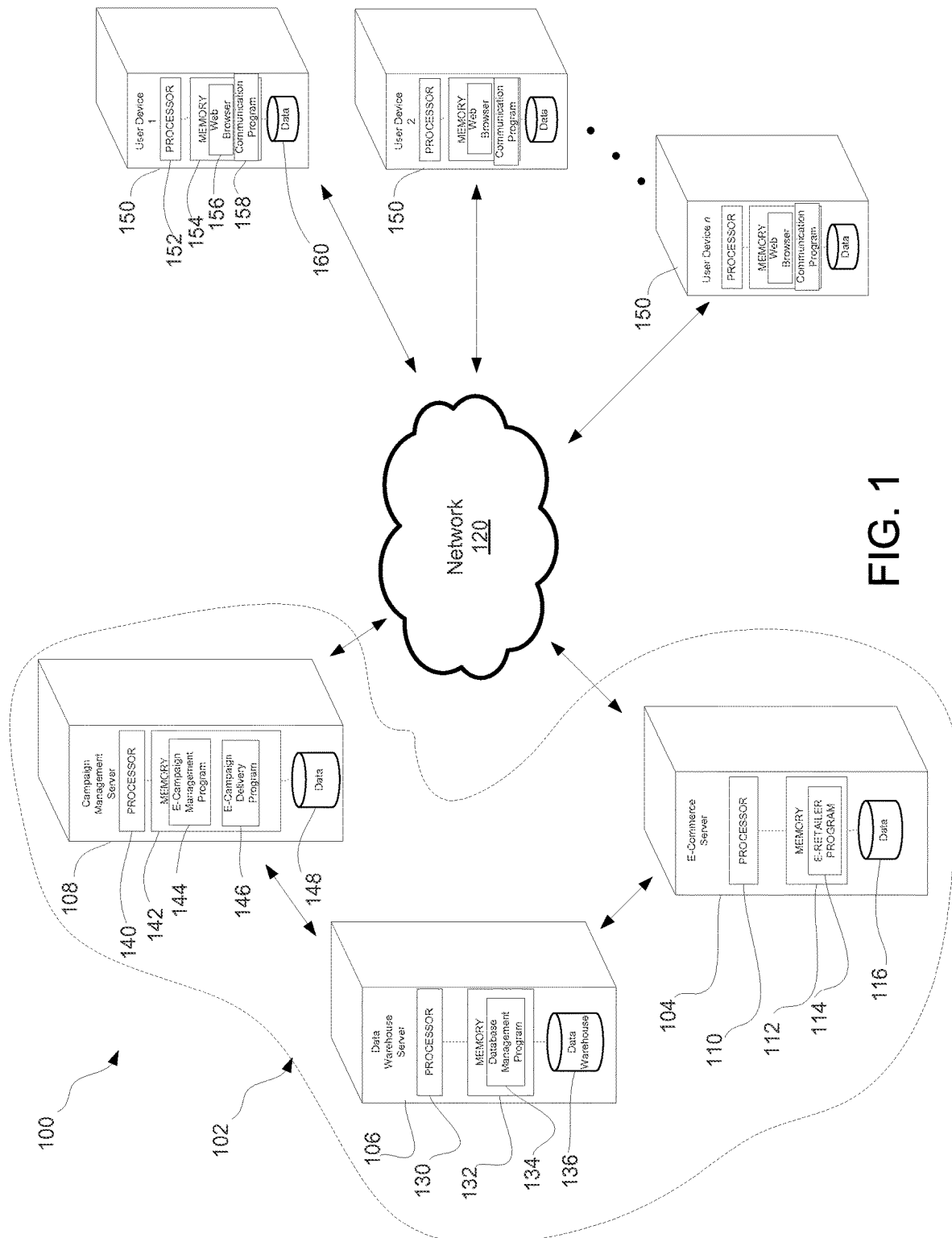
FIG. 1 is a schematic diagram of a system for managing online advertising campaigns pursuant to an illustrative embodiment of the present disclosure.

For the purposes of promoting an understanding of the principles in accordance with the disclosure, reference will now be made to the embodiments illustrated in the drawings and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below. As used herein, the terms "comprising," "including," "containing," "having," "characterized by," and grammatical equivalents thereof are inclusive or open-ended terms that do not exclude additional, unrecited elements or method steps.

Various embodiments of the present invention advantageously provide systems, devices, programs, non-transitory computer readable mediums, and methods for managing multiple e-marketing campaigns to reduce user fatigue and to increase user responses.

Referring now to FIG. 1, according to examples of embodiments of the present invention, a system 100 can be utilized to conduct e-commerce with users. In particular, the system 100 comprises an e-commerce enterprise 102. The e-commerce enterprise 102 comprises a plurality of servers, including an e-commerce server 104, a data warehouse server 106, and an e-campaign management server 108. The e-commerce enterprise 102 may include additional servers. Further, it will be appreciated that the e-commerce server 104, the data warehouse server 106, and the e-campaign management server 108 may be located in the same physical location or at remote physical locations.

In an illustrative embodiment, the e-commerce server 104, the data warehouse server 106, and the e-campaign management server 108 may each comprise multi-processor computers, server farms, multiple computer systems, multiple databases and storage devices (including hierarchies of storage and access), and other implementations that will be recognized by those having skill in the art as encompassed within the embodiments of the present invention. For example, a single computer, a plurality of computers, a server, or server cluster or server farm may be employed to implement each of the e-commerce server 104, the data warehouse server 106, and the e-campaign management server 108, and this disclosure does not limit any configuration of computers and servers for each.

Moreover, each of the e-commerce server 104, the data warehouse server 106, and the e-campaign management server 108 may each be deployed as a server farm, data center or server cluster managed by a server host, and the number of servers and their architecture and configuration may be increased based on usage, demand, and capacity requirements for the system. Moreover, illustrative embodiments of the e-commerce server 104, the data warehouse server 106, and the e-campaign management server 108 may each include clusters of computers, servers, storage devices, display devices, input devices and other components interacting together, as understood by those skilled in the art.

As illustrated in FIG. 1, the e-commerce server 104 includes a processor 110 coupled to a memory 112. Stored in the memory 112 is an e-retailer program 114 that contains instructions that are executable by the processor 110. The e-commerce server 104 may also include a storage medium 116 for storing operational data. When executed, the e-retailer program 114 allows users at remote computing devices 150 to engage in e-commerce with the e-commerce server 104.

In particular, each remote computing device 150 may include a processor 152 coupled to a memory 154. Each remote computing device 150 may further include one or more user input devices (not shown) such as computer mouses, keyboards, and touch screens. In an illustrative embodiment, stored in the memory 154 may be a web browser program 156. As is known to one having ordinary skill in the art, the web browser program 156 is a program used for retrieving, presenting, and traversing information resources on the World Wide Web over the network 120. To engage in e-commerce with the e-commerce server 104, users navigate to a website hosted by the e-commerce server 104 using the web browser program 156. The users may then buy goods or services electronically from the e-commerce server 104 using the web browser program 156.

To facilitate e-commerce, the e-retailer program 114 may provide a search feature whereby users can search for desired products listed for sale on the website hosted by the e-commerce server. For example, the e-retailer program 114 may provide product webpages featuring products for sale. The e-retailer program 114 may provide a checkout procedure such that users can provide payment, shipping, and contact information for purchased products.

In an illustrative embodiment, users may be prompted by the e-retailer program 114 to register with the e-commerce enterprise 102. To register, users may be required to provide electronic contact information, such as an e-mail address or a cell phone number capable of receiving texts. In addition, the e-retailer program 114 may prompt users to provide demographic information, including age, income, gender, hobbies, and general interests. Additional demographic information about users may be obtained from third-party sources.

The remote computing devices 150 may each include a communication program 158. The communication program 158 may enable the remote computing devices 150 to send and receive electronic messages. In an illustrative embodiment, the communication program 158 is an email program. In another illustrative embodiment, the communication program 158 is a texting program. In still another illustrative embodiment, the remote computing devices 150 may include a storage medium 160 for storing operational data. In yet another illustrative embodiment, the communication program 158 may be a web browser that allows users to access online communication websites, such as Gmail, Yahoo, MSN, or any other websites that provide email services of the web.

In an illustrative embodiment, the remote computing devices 150 are computers, such as desktop or laptop computers. In another illustrative embodiment, the remote computing devices 150 are smart phones. In still another illustrative embodiment, the remote computing devices 150 are tablet computers, smart music players or wireless web-enabled electronic devices. Thus, it will be appreciated that the remote computing devices 150 can take a wide variety of forms, all of which fall within the scope of the present disclosure.

In an illustrative embodiment, the e-retailer program 114 includes a tracking feature on webpages that tracks information about users as the users interact with the e-commerce server 104 from the remote computing devices 150. In an illustrative embodiment, the tracking feature is operated by a third party. In an illustrative embodiment, the tracked information can include a wide range of information, including, but not limited to, products viewed, search terms used in product searches, purchases made, products placed in a virtual shopping cart but not purchased (sometimes referred to as "abandoned carts"), and other information that may indicate a user's interest in a product. In an illustrative embodiment, a third-party entity may track the users' interaction with the e-commerce server 104 as is known to one having ordinary skill in the art. As used herein, the term "product" may refer to a product or a service.

The user information, described above, is organized and stored by the data warehouse server 106. The data warehouse server 106 includes a processor 130 coupled to a memory 132. Stored in the memory 132 is a database management program 134 that contains instructions that are executable by the processor 130. The data warehouse server 106 may also include a storage medium 136 for storing the warehoused data in a database format as is known to those skilled in the art. As used herein, the term "storage medium" may refer to a hard disk array that links multiple physical hard drives into one large "drive" for advanced data control.

The database management program 134 is software that controls the creation, maintenance, and use of the database of user information on the storage medium 136. The database management program 134 may perform operations on the database, such as a query of the database for requested information. The data warehouse server 106 may also include product information. In an illustrative embodiment, the product information may include images and product descriptions. In another illustrative embodiment, the product information may further include pricing information.

The e-campaign management server 108 includes a processor 140 coupled to a memory 142. Stored in the memory 142 is an e-campaign management program 144 and an e-campaign delivery program 146, each of which contains instructions that are executable by the processor 140. The e-campaign management server 108 may also include a storage medium 148 for storing data, as is known to one having ordinary skill in the art.

In an illustrative embodiment, the e-campaign management program 144 allows the operator of the e-commerce enterprise 102 to define e-marketing campaigns. In particular, the e-campaign management program 144 allows the operator to define the recipients for an e-marketing campaign. As used herein, an e-marketing campaign can be an advertising campaign performed using a communications network.

In addition, the e-campaign management program 144 allows the operator to define the e-marketing contents of the electronic messages of e-marketing campaigns. In an illustrative embodiment, the e-campaign management program 144 allows the operator to define a template with variables. The variables are populated with data. The e-marketing contents may include customized text and graphics. The e-marketing contents may include links to product webpages hosted by the e-commerce server 104 on the network 120. The delivery channels for an e-marketing campaign include, but are not limited to, email, text messages, banner ads, websites, etc. It will be appreciated that e-marketing content can be provided through any electronic communication channel. The network 120 may include wired and wireless networks.

The e-campaign management program 144 allows multiple e-marketing campaigns to be ongoing simultaneously. E-marketing campaigns may be run automatically on a recurring basis. For example, e-marketing campaigns may be defined to run hourly, daily, weekly or monthly. Additionally, e-marketing campaigns may be run on a one-time basis, such as in the case of a special promotion on a product.

To initiate an e-marketing campaign, the e-campaign management program 144 allows an operator to define a target profile for the recipients. For example, the target profile may include all users who abandoned a product in a virtual shopping cart within a preset time period, such as within the last 24 hours. In another example, the target profile may include all users who may be potentially interested in a particular product. In another example, the target profile may include all users who have selected to receive advertisements.

Once the operator has defined the target profile, the e-campaign management program 144 allows the operator to define the e-marketing content for the campaign. To facilitate customized content, the e-campaign management program 144 allows an operator to create a template for the e-marketing content. In an illustrative embodiment, the e-marketing content is customized for each recipient using the template. For example, for an abandoned cart campaign, the e-marketing content may include an image of the product that was abandoned by the user as well as a link to a specific product webpage hosted by the e-commerce server 104. Other campaigns, such as for a special promotion for a product, may send the same e-marketing content. But, even for these type of campaigns, some of the e-marketing content may be customized, such as the name of the user.

The e-campaign management program 144 allows an operator to assign a priority level or ranking to each e-campaign. In particular, e-campaigns that have historically higher response rates are given a higher priority level than e-campaigns with lower response rates. For example, an e-campaign that targets users who have recently abandoned an item in a virtual shopping cart may be given a higher priority level than an e-campaign that features a product. This is because abandoned cart e-campaigns typically have a relatively high response rate as compared to e-campaigns that just feature a product.

The e-campaign management program 144 may allow an operator to assign a run time. In an embodiment, an e-campaign may run hourly, daily, weekly, or monthly. For example, the e-campaign management program 144 may run an abandoned cart campaign daily. The e-campaign management server 108 may generate multiple e-campaigns concurrently.

To form an e-campaign, the e-campaign management program 144, performs a query of the user information maintained by the data warehouse server 106. In particular, the e-campaign management program 144 requests that the data warehouse server 106 identify those users whose profile matches the target profile defined by the operator. In addition, the e-campaign management program 144 requests that the data warehouse server 106 return the necessary e-marketing content for each user. Again, the e-marketing content includes information necessary to complete the template for the e-marketing campaign, including, but not limited to, user name, user contact information, link information to product webpages, product images, product price, and any other information necessary to populate the template. In an illustrative embodiment, the e-commerce server 104, the data warehouse server 106, and the e-campaign management server 108 are connected over a local area network or a wide area network.

Figure 2:
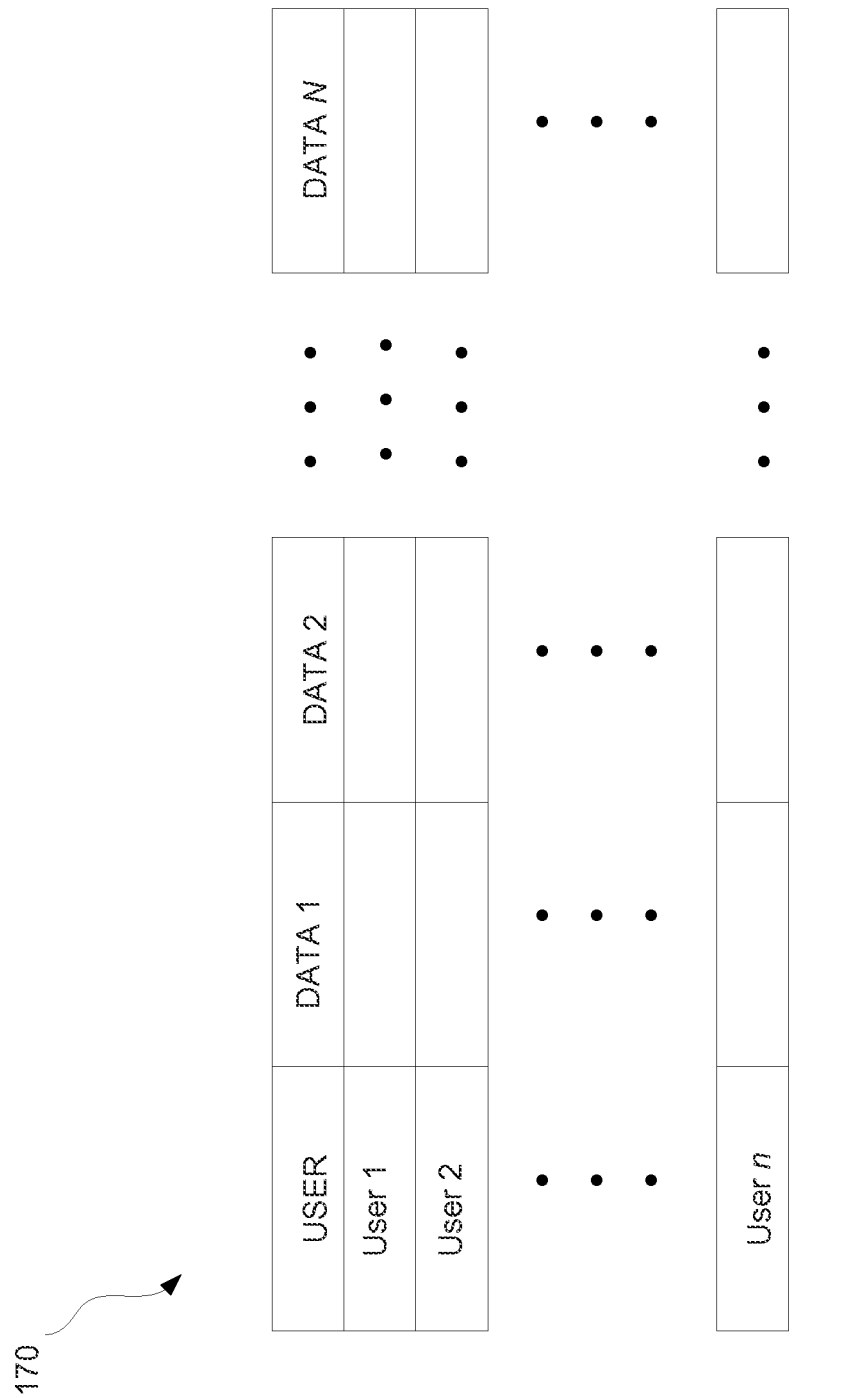
FIG. 2 is a schematic diagram of a table of user data in a data warehouse of an e-commerce enterprise pursuant to an illustrative embodiment of the present disclosure.

The e-campaign management program 144 stores the returned information from the data warehouse server 106 using data tables in the storage medium 148. For example, the data, or data location, to be utilized for each targeted user are stored in a row of a data table 170 as shown in FIG. 2. The data table 170 may identify each user by a user ID number. The Data 1 through Data N may include the data necessary to complete a customized template for each user. The Data 1 through Data N may further include contact information for the user, such as an email address or cell phone number.

In an illustrative embodiment, the e-campaign management program 144 allows the operator to define a maximum number of electronic communications received by a user within a given time frame. For example, the operator may specify that a user may not receive more than one electronic communication from the e-commerce enterprise 102 per day.

Once the data table 170 is complete, there is typically a brief period of time between the completion of the data table 170 and the actual implementation of the e-marketing campaign, i.e., the transmission of the electronic messages to the targeted users. During this time period, the e-campaign management program 144 may suppress a user from an e-marketing campaign if the number of electronic communications sent to that user within a predetermined time frame exceeds the threshold established by the operator of the e-commerce enterprise 102.

In addition, during the time period between the identification of the targeted users and the actual implementation of an e-marketing campaign, i.e., the transmission of the electronic messages to the targeted users, the e-campaign management program 144 compares the priority level of all co-pending e-marketing campaigns. In an illustrative embodiment, targeted users in low priority e-marketing campaigns are suppressed in favor of high priority e-marketing campaigns. As will be explained below, this is accomplished by comparing the data tables 170 of different e-marketing campaigns and determining users who are targeted in both campaigns. Targeted users appearing in multiple e-marketing campaigns are suppressed from the lower priority campaigns.

Figure 3:
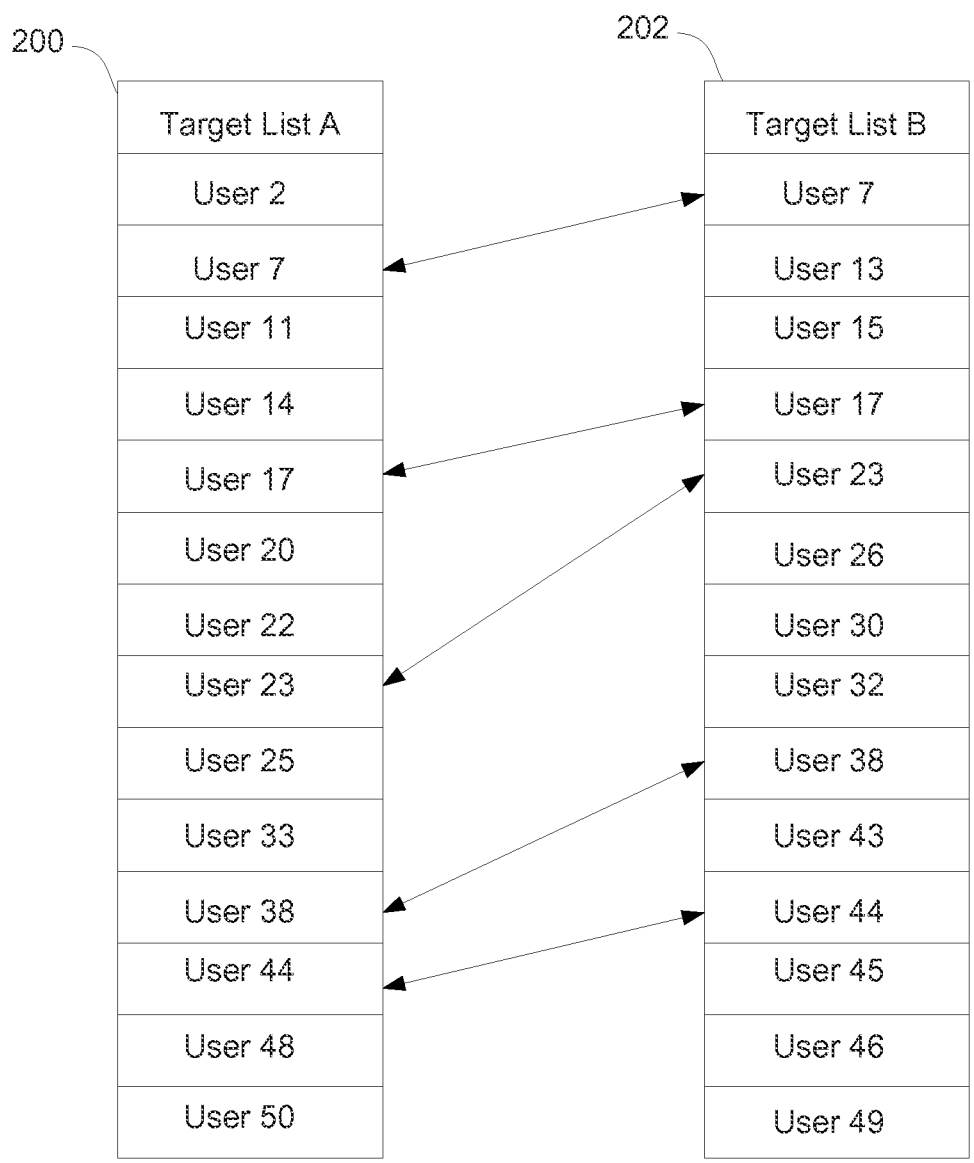
FIG. 3 depicts exemplary lists of targeted users for online marketing campaigns pursuant to an illustrative embodiment of the present disclosure.

Referring now to FIG. 3, there is depicted an exemplary data table 200 for a first campaign, labeled as "Target List A," and an exemplary second data table 202 for a second campaign, labeled as "Target List B." It will be appreciated that the data tables 200 and 202 may contain additional data such as explained in relation to the data table 170 depicted in FIG. 2. However, for purposes of clarity, only one column in each of data tables 200 and 202 is depicted.

As can be observed, each of the data tables 200 and 202 comprises a list of targeted users for each of their respective e-marketing campaigns. As can be further observed, the list of targeted users in each of the data tables 200 and 202 comprises some of the same targeted users. For example, User 7 appears in both data tables 200 and 202. In this example, the second campaign, represented by data table 202, has a higher priority than the first campaign, represented by data table 200.

Figure 4:
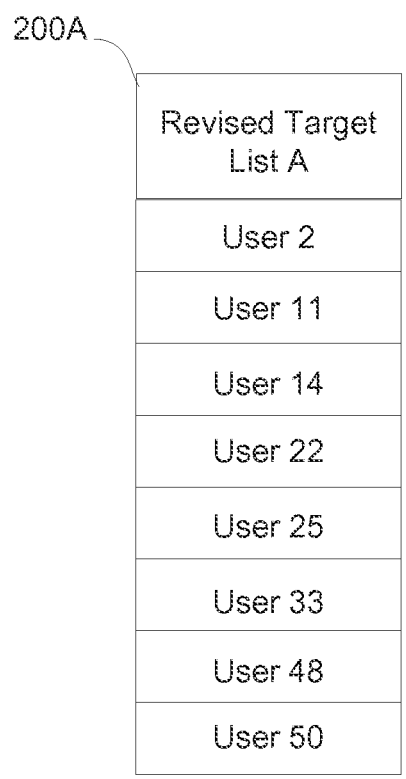
FIG. 4 depicts a revised or suppressed exemplary list of targeted users for an online marketing campaign pursuant to an illustrative embodiment of the present disclosure.

Referring now to FIG. 4, there is depicted a revised data table 200A for the first campaign. In particular, those targeted users in the second campaign, see data table 202 in FIG. 3, have been suppressed from the first campaign by the e-campaign management program 144 on the server 108. As used herein, the term "suppress" may refer to preventing targeted users from receiving an electronic communication in conjunction with a campaign. Thus, the targeted users appearing in both the data tables 200 and 202, see FIG. 3, will only receive an electronic communication associated with the second campaign, data table 202, since it has been assigned a higher priority level than the first campaign, data table 200.

Once the e-campaign management program 144 has suppressed targeted users from low-level priority campaigns, the e-campaign delivery program 146 on the campaign management server 108 forms and delivers the electronic messages to the targeted users as is known to those skilled in the art. Again, this may include emailing or texting the targeted users with a customized electronic communication.

Figure 5:
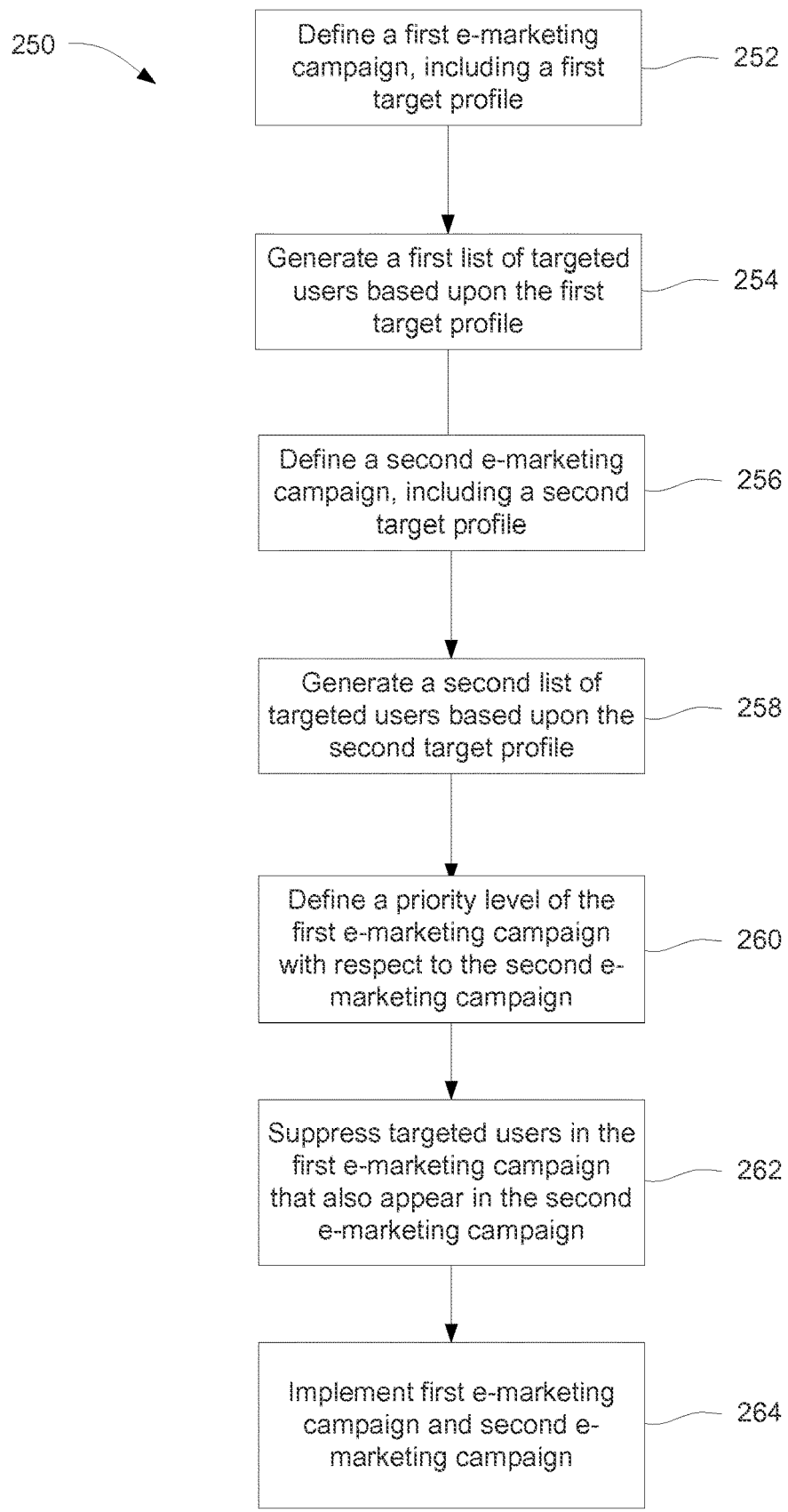
FIG. 5 is a schematic flow chart of a method of managing multiple e-marketing campaigns according to an illustrative embodiment of the present disclosure.

Referring now to FIG. 5, there is depicted a flow diagram 250 for suppressing a first e-marketing campaign based on a higher priority and second e-marketing campaign pursuant to an illustrative embodiment of the present disclosure. At step 252, an operator of an e-commerce enterprise defines a first e-marketing campaign, including a first target profile. At step 254, a computer server generates a first list of targeted users from a list of users of an e-commerce website based upon the first target profile. At step 256, an operator of an e-commerce enterprise defines a second e-marketing campaign, including a second target profile. At step 258, a computer server generates a second list of targeted users from a list of users of an e-commerce website based upon the second target profile. At step 260, a priority level of the first e-marketing campaign is defined with respect to the second e-marketing campaign. At step 262, those targeted users in the first e-marketing campaign that also appear in the second e-marketing campaign are suppressed from the first e-marketing campaign using a computer server. At step 264, the first e-marketing campaign and the second e-marketing campaign are implemented by forming and delivering electronic messages to the targeted users.

In an illustrative embodiment of the present disclosure, a non-transitory computer readable medium comprises a set of computer readable instructions that, when executed by a processor, cause the processor to perform one or more of the following operations: (i) define a first e-marketing campaign, the first e-marketing campaign comprising a first target user profile, (ii) generate a first data table of targeted users of the e-commerce website based on the first target user profile, (iii) define a second e-marketing campaign, the second e-marketing campaign comprising a second target user profile, (iv) generate a second data table of targeted users of the e-commerce website based on the second target user profile, (v) suppress from the first e-marketing campaign those targeted users in the first data table who also appear in the second data table of the second e-marketing campaign, (vi) define a first message template for the first e-marketing campaign and a second message template for the second e-marketing campaign, (vii) generate and transmit electronic messages to the non-suppressed targeted users in the first e-marketing campaign based on the first message template, (viii) generate and transmit electronic messages to the targeted users in the second e-marketing campaign based on the second message template, and (ix) define a third e-marketing campaign, the third e-marketing campaign comprising a third target user profile and generate a third data table of targeted users of the e-commerce website based on the third target user profile and suppress from the third e-marketing campaign those targeted users in the third data table who also appear in the second data table of the second e-marketing campaign.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function, and manner of operation, assembly, and use may be made without departing from the principles and concepts set forth herein.

What is claimed is:

1. A method of creating an e-commerce website facilitating creation of multiple e-marketing campaigns for an e-commerce enterprise, the method comprising:

providing the e-commerce website with a web browser program that retrieves, presents, and traverses information sources, and an e-commerce management program; and providing an e-commerce server that hosts the e-commerce website and enables e-commerce transactions of products and services via the e-commerce website;

wherein the method executed by the e-commerce management program of the e-commerce website that creates multiple e-marketing campaigns comprises:

collecting and storing data on a plurality of potential targeted users and creating a customized template for each potential targeted user;

defining a first e-marketing campaign using a processor of an e-campaign management server, the first e-marketing campaign comprising a first target user profile;

generating a first data table of targeted users of the first e-marketing campaign by comparing the first target user profile with the customized template of each potential targeted user using the processor of the e-campaign management server;

generating at least one message to be sent to the targeted users of the first e-marketing campaign, wherein each of the at least one messages is generated and customized for each recipient and includes a link to a product webpage hosted by the e-commerce server;

defining a second e-marketing campaign using the processor of the e-campaign management server, the second e-marketing campaign comprising a second target user profile;

generating a second data table of targeted users of the second e-marketing campaign by comparing the second target user profile with the customized template of each potential targeted user using the processor of the e-campaign management server, wherein at least one targeted user appears in both the first data table of targeted users and the second data table of targeted users;

generating at least one message to be sent to the targeted users of the second e-marketing campaign, wherein each of the at least one messages is generated and customized for each recipient and includes a link to a product webpage hosted by the e-commerce server;

wherein at least one of the first e-marketing campaign and the second e-marketing campaign comprises an abandoned cart campaign;

assigning a run time to each of the first e-marketing campaign and the second e-marketing campaign;

prior to implementing the first e-marketing campaign and the second e-marketing campaign, assigning a first priority level to the first e-marketing campaign using the processor of the e-campaign management server;

prior to implementing the first e-marketing campaign and the second e-marketing campaign, assigning a second priority level to the second e-marketing campaign using the processor of the e-campaign management server;

wherein the first priority level and the second priority level are based upon historical response rates associated with the first e-marketing campaign and the second e-marketing campaign, respectively;

wherein the first priority level has a higher historical response rate as compared to the second priority level;

processing the first priority level and the second priority level using the processor of the e-campaign management server to determine which of the first e-marketing campaign and the second e-marketing campaign has a lowest priority level;

processing the first priority level and the second priority level using the processor of the e-campaign management server to determine which of the first e-marketing campaign and the second e-marketing campaign has a highest priority level;

comparing the first data table of targeted users and the second data table of targeted users and generating a revised data table of targeted users for the determined lowest priority level e-marketing campaign by removing those users in the first data table of targeted users and the second data table of targeted users from the revised data table;

implementing the determined highest priority level e-marketing campaign each run time by creating and delivering custom electronic messages only to the targeted users appearing in a data table of targeted users related to the determined highest priority level e-marketing campaign, and implementing the determined lowest priority level e-marketing campaign each run time by creating and delivering custom electronic messages only to non-suppressed targeted users appearing in the revised data table related to the determined lowest priority level e-marketing campaign;

wherein the e-commerce management program additionally defines a maximum number of electronic communications received by a targeted user within a given time frame and suppresses targeted users that would receive more than the defined maximum number of electronic communications in the given time frame.

2. The method of claim 1, further comprising defining a first message template for the first e-marketing campaign and a second message template for the second e-marketing campaign, the first message template and the second message template including variables.

3. The method of claim 2, wherein the first data table is generated to include data indicated by the variables in the first message template and the second data table is generated to include data indicated by the variables in the second message template.

4. The method of claim 3, further comprising generating and transmitting electronic messages to a group of the non-suppressed targeted users in the first e-marketing campaign based on the first message template.

5. The method of claim 4, further comprising generating and transmitting electronic messages to the targeted users in the second e-marketing campaign based on the second message template.

6. The method of claim 5, wherein the electronic messages to the non-suppressed targeted users in the first e-marketing campaign and to the targeted users in the second e-marketing campaign are delivered using one of email and texting.

7. The method of claim 1, further comprising:

defining a third e-marketing campaign using a processor of an e-campaign management server, the third e-marketing campaign comprising a third target user profile;

generating a third data table of targeted users of the third e-marketing campaign by comparing the third target user profile with the customized template of each potential targeted user using the processor of the e-campaign management server;

generating at least one message to be sent to the targeted users of the third e-marketing campaign, wherein each of the at least one messages is generated and customized for each recipient and includes a link to a product webpage hosted by the e-commerce server; and suppressing from the third e-marketing campaign those targeted users in the third data table who also appear in the second data table of the second e-marketing campaign using the processor of the e-campaign management server.

8. The method of claim 1, further comprising suppressing targeted users appearing in the first e-marketing campaign and the second e-marketing campaign who have previously received a number of electronic communications within a predetermined time frame that exceeds a pre-determined threshold using the processor of the e-campaign management server.

9. A system for creating an e-commerce website facilitating creation of multiple e-marketing campaigns for an e-commerce enterprise, the system comprising:

a processor;

a memory coupled to the processor;

the e-commerce website including a web browser program that retrieves, presents, and traverses information sources, and an e-commerce management program;

an e-commerce server that hosts the e-commerce website and enables e-commerce transactions of products and services via the e-commerce website and the processor;

and a set of computer readable instructions stored in the memory, that when executed by the e-commerce management program and the processor, cause the processor to:

(i) collect and store data on a plurality of potential targeted users and create a customized template for each potential targeted user;

(ii) define a first e-marketing campaign comprising a first target user profile, (iii) generate a first data table of targeted users of the first e-marketing campaign by comparing the first target user profile with the customized template of each potential targeted user, (iv) generate at least one message to be sent to the targeted users of the first e-marketing campaign, wherein each of the at least one messages is generated and customized for each recipient and includes a link to a product webpage hosted by the e-commerce server;

(v) define a second e-marketing campaign comprising a second target user profile, (vi) generate a second data table of targeted users of the second e-marketing campaign by comparing the second target user profile with the customized template of each potential targeted user, wherein at least one targeted user appears in both the first data table of targeted users and the second data table of targeted users;

(vii) generate at least one message to be sent to the targeted users of the second e-marketing campaign, wherein each of the at least one messages is generated and customized for each recipient and includes a link to a product webpage hosted by the e-commerce server;

(viii) prior to implementing the first e-marketing campaign and the second e-marketing campaign, assign a first priority level to the first e-marketing campaign based upon a historical response rate associated with the first e-marketing campaign, (ix) prior to implementing the first e-marketing campaign and the second e-marketing campaign campaign, assign a second priority level to the second e-marketing campaign based upon a historical response rate associated with the second e-marketing campaign, (x) compare the first priority level and the second priority level to determine which of the first e-marketing campaign and the second e-marketing campaign has a lowest priority level, (xi) compare the first priority level and the second priority level to determine which of the first e-marketing campaign and the second e-marketing campaign has a highest priority level, (xii) compare the first data table of targeted users and the second data table of targeted users and generating a revised data table of targeted users for the determined lowest priority level e-marketing campaign by removing those users in the first and second data tables of targeted users from the revised data table;

(xiii) implement the determined highest priority level e-marketing campaign by creating and delivering a custom electronic message only to the targeted users appearing in a data table related to the determined highest priority level e-marketing campaign; and (xiv) implement the determined lowest priority level e-marketing campaign by creating and delivering a custom electronic message only to tho non-suppressed targeted users appearing in the revised data table related to the determined lowest priority level e-marketing campaign;

wherein at least one of the first e-marketing campaign and the second e-marketing campaign comprises an abandoned cart campaign;

wherein the e-commerce management program assigns a run time to each of the first e-marketing campaign and the second e-marketing campaign and runs each campaign according to the run time;

wherein the first priority level has a higher historical response rate as compared to the second priority level and wherein the e-commerce management program additionally defines a maximum number of electronic communications received by a targeted user within a given time frame and suppresses targeted users that would receive more than the defined maximum number of electronic communications in the given time frame.

10. The system of claim 9, wherein the set of computer readable instructions stored in the memory, when executed by the processor, are further operable to cause the processor to: define a first message template for the first e-marketing campaign and a second message template for the second e-marketing campaign.

11. The system of claim 10, wherein the set of computer readable instructions stored in the memory, when executed by the processor, is further operable to cause the processor to: generate and transmit electronic messages to the non-suppressed targeted users in the first e-marketing campaign based on the first message template.

12. The system of claim 11, wherein the set of computer readable instructions stored in the memory, when executed by the processor, is further operable to cause the processor to: generate and transmit electronic messages to the targeted users in the second e-marketing campaign based on the second message template.

13. The system of claim 9, wherein the set of computer readable instructions stored in the memory, when executed by the processor, is further operable to cause the processor to:
define a third e-marketing campaign, the third e-marketing campaign comprising a third target user profile;
generate a third data table of targeted users of the third e-marketing campaign by comparing the third target user profile with the customized template of each potential targeted user;
generate at least one message to be sent to the targeted users of the third e-marketing campaign, wherein each of the at least one messages is generated and customized for each recipient and includes a link to a product webpage hosted by the e-commerce server; and
suppress from the third e-marketing campaign those targeted users in the third data table who also appear in the second data table of the second e-marketing campaign.

14. The system of claim 9, wherein the set of computer readable instructions stored in the memory, when executed by the processor, is further operable to cause the processor to: assign a priority level to each of the first e-marketing campaign and the second e-marketing campaign.

15. A non-transitory computer medium for creating an e-commerce website facilitating the creation of multiple e-marketing campaigns for an e-commerce enterprise, the non-transitory computer medium comprising:

providing the e-commerce website with a web browser program that retrieves, presents, and traverses information sources, and an e-commerce management program;
providing an e-commerce server that hosts the e-commerce website and enables e-commerce transactions of products and services via the e-commerce website; and
a set of computer readable instructions, that when executed by the e-commerce management program and a processor, cause the processor to:
(i) collect and store data on a plurality of potential targeted users and create a customized template for each potential targeted user;
(ii) define a first e-marketing campaign comprising a first target user profile,
(iii) generate a first data table of targeted users of the first e-marketing campaign by comparing the first target user profile with the customized template of each potential targeted user,
(iv) generate a first message to be sent to the targeted users of the first e-marketing campaign, wherein the first messages is generated and customized for each recipient and includes a link to a product webpage hosted by the e-commerce server;
(v) define a second e-marketing campaign comprising a second target user profile,
(vi) generate a second data table of targeted users of the second e-marketing campaign by comparing the second target user profile with the customized template of each potential targeted user, wherein at least one targeted user appears in both the first data table of targeted users and the second data table of targeted users,
(vii) generate a second message to be sent to the targeted users of the second e-marketing campaign, wherein the second messages is generated and customized for each recipient and includes a link to a product webpage hosted by the e-commerce server;
(viii) prior to implementing the first and second e-marketing campaign, assign a first priority level to the first e-marketing campaign based upon a historical response rate associated with the first e-marketing campaign,
(ix) prior to implementing the first and second e-marketing campaign assign a second priority level to the second e-marketing campaign based upon a historical response rate associated with the second e-marketing campaign,
(x) compare the first priority level and the second priority level to determine which of the first e-marketing campaign and the second e-marketing campaign has a lowest priority level,
(xi) compare the first priority level and the second priority level to determine which of the first e-marketing campaign and the second e-marketing campaign has a highest priority level,
(xii) compare the first data table of targeted users and the second data table of targeted users and generating a revised data table of targeted users for the determined lowest priority level e-marketing campaign by removing those users in the first and second data tables of targeted users from the revised data table;
(xiii) implement the determined highest priority level e-marketing campaign by creating and delivering a custom electronic message only to the targeted users appearing in a data table related to the determined highest priority level e-marketing campaign; and
(xiv) implement the determined lowest priority level e-marketing campaign by creating and delivering a custom electronic message only to tho non-suppressed targeted users appearing in the revised data table related to the determined lowest priority level e-marketing campaign;

wherein at least one of the first e-marketing campaign and the second e-marketing campaign comprises an abandoned cart campaign;

wherein the e-commerce management program assigns a run time to each of the first e-marketing campaign and the second e-marketing campaign and runs each campaign according to the run time;

wherein the first priority level has a higher historical response rate as compared to the second priority level, and wherein the e-commerce management program additionally defines a maximum number of electronic communications received by a targeted user within a given time frame and suppresses targeted users that would receive more than the defined maximum number of electronic communications in the given time frame.

16. The non-transitory computer medium of claim 15, wherein the set of computer readable instructions stored thereon, when executed by the processor, is further operable to cause the processor to: define a first message template for the first e-marketing campaign and a second message template for the second e-marketing campaign.

17. The non-transitory computer medium of claim 16, wherein the set of computer readable instructions stored therein, when executed by the processor, is further operable to cause the processor to: generate and transmit electronic messages to the non-suppressed targeted users in the first e-marketing campaign based on the first message template.

18. The non-transitory computer medium of claim 17, wherein the set of computer readable instructions stored therein, when executed by the processor, is further operable to cause the processor to: generate and transmit electronic messages to the targeted users in the second e-marketing campaign based on the second message template.

19. The non-transitory computer medium of claim 15, wherein the set of computer readable instructions stored therein, when executed by the processor, is further operable to cause the processor to:
- define a third e-marketing campaign, the third e-marketing campaign comprising a third target user profile;
- generate a third data table of targeted users of the third e-marketing campaign by comparing the third target user profile with the customized template of each potential user;
- generate at least one message to be sent to the targeted users of the third e-marketing campaign, wherein each of the at least one messages is generated and customized for each recipient and includes a link to a product webpage hosted by the e-commerce server; and
- suppress from the third e-marketing campaign those targeted users in the third data table who also appear in the second data table of the second e-marketing campaign.

* * * * *